United States Patent [19]

Gareiss et al.

[11] Patent Number: 5,298,547
[45] Date of Patent: Mar. 29, 1994

[54] FLAMEPROOF THERMOPLASTIC MOLDING MATERIALS

[76] Inventors: Brigitte Gareiss, Schillerstrasse 65, 6700 Ludwigshafen; Karl Schlichting, Virchowstrasse 12, 6712 Bobenheim-Roxheim, both of Fed. Rep. of Germany

[21] Appl. No.: 979,320

[22] Filed: Nov. 20, 1992

[30] Foreign Application Priority Data

Nov. 22, 1991 [DE] Fed. Rep. of Germany ....... 4138386

[51] Int. Cl.$^5$ .............................................. C08K 3/26
[52] U.S. Cl. ..................................... 524/425; 524/424
[58] Field of Search ................................ 524/424, 425

[56] References Cited

U.S. PATENT DOCUMENTS

| | | | |
|---|---|---|---|
| 3,339,013 | 8/1967 | Gainer et al. | 524/424 |
| 3,468,839 | 9/1969 | Millane | 524/424 |
| 5,057,367 | 10/1991 | Morii et al. | 524/425 |

FOREIGN PATENT DOCUMENTS 207750  1/1987  European Pat. Off. .
53-14198  2/1978  Japan .

OTHER PUBLICATIONS

JP 5 3104-650 Derwent Abst.
JP 6 3210-165 Derwent Abst.

*Primary Examiner*—Veronica P. Hoke

[57] ABSTRACT

Thermoplastic molding materials contain, as essential components,

A) from 30 to 80% by weight of a thermoplastic polyester and

B) from 20 to 70% by weight of a mixture of carbonates of metals of the 2nd main group of the Periodic Table.

3 Claims, No Drawings

FLAMEPROOF THERMOPLASTIC MOLDING MATERIALS

The present invention relates to thermoplastic molding materials containing, as essential components, A) from 30 to 80% by weight of a thermoplastic polyester and B) from 20 to 70% by weight of a mixture of carbonates of metals of the 2nd main group of the Periodic Table.

The present invention furthermore relates to the use of these thermoplastic molding materials for the production of fibers, films and moldings and to the moldings obtainable from the thermoplastic molding materials.

Thermoplastic polyesters are used in various areas, for example in the automotive sector, for the production of housings for electrical appliances or in the building sector.

For many applications, it is necessary for the thermoplastic polyester molding materials to be flameproof. Conventional flameproofing agents which do not adversely affect the pale natural color of the molding materials, e.g. $Al(OH)_3$ or $Mg(OH)_2$, are unsuitable for use in thermoplastic polyester molding materials. $Al(OH)_3$ is thermally unstable at the temperatures required for processing polyesters, so that water is eliminated even while it is being mixed in. When $Mg(OH)_2$ is used, the basicity of $Mg(OH)_2$ causes cleavage of the polyester bonds during processing, resulting in a dramatic reduction in the viscosity.

EP-A 207 750 describes the use of magnesium carbonates as fillers and flameproofing agents in plastics. Here, however, the flame-retardant effect, due to the elimination of $CO_2$, is unsatisfactory.

Owing to their basicity, the mixtures of basic magnesium carbonate and hydrodulcite, described in Japanese Patent 53104-650, and the basic magnesium carbonates described in Japanese Patent 63210-165 are unsuitable as flameproofing agents for thermoplastic polyesters since, like $Mg(OH)_2$, they lead to cleavage of the polyester bonds.

It is an object of the present invention to provide flameproof thermoplastic polyester molding materials which simultaneously have good electrical and mechanical properties.

We have found that this object is achieved by the thermoplastic molding materials defined at the outset. We have also found the use of said materials for the production of fibers, films and moldings and the moldings obtainable from the thermoplastic molding materials.

The novel thermoplastic molding materials contain, as component A), from 30 to 80, preferably from 40 to 70, in particular from 45 to 65%, by weight of a thermoplastic polyester.

Such polyesters are known per se. Preferably used polyesters are those which contain an aromatic ring in the main chain. The aromatic ring may furthermore be substituted, for example by halogens, such as chlorine and bromine, and/or by $C_1$-$C_4$-alkyl, e.g. methyl, ethyl, isopropyl, n-propyl, isobutyl, n-butyl and tert-butyl.

The polyesters can be prepared by reacting dicarboxylic acids, esters thereof or other ester-forming derivatives with dihydroxy compounds in a conventional manner.

Examples of suitable dicarboxylic acids are aliphatic and aromatic dicarboxylic acids, which may also be used in the form of a mixture. Naphthalene-dicarboxylic acids, terephthalic acid, isophthalic acid, adipic acid, azelaic acid, sebacic acid, dodecanedioic acid and cyclohexanedicarboxylic acids, mixtures of these dicarboxylic acids and ester-forming derivatives thereof may be mentioned here merely by way of example.

Preferably used dihydroxy compounds are diols of 2 to 10 carbon atoms, particularly preferably ethylene glycol, 1,3-propanediol, 1,4-butanediol, 1,4-butenediol and 1,6-hexanediol; however, it is also possible to use 1,4-hexanediol, 1,4-cyclohexanediol, 1,4-di-(hydroxymethyl)-cyclohexane, bisphenol A, neopentylglycol, mixtures of these diols and ester-forming derivatives thereof.

Polyesters of terephthalic acid and naphthalenedicarboxylic acids and a $C_2$-$C_6$-diol component, for example polyethylene terephthalate, polyethylene naphthalate, polypropylene terephthalate or polybutylene terephthalate or mixtures thereof are particularly preferred.

Of course, polyester block copolymers, such as copolyether esters, can also be used. Such products are known per se and are described in the literature, for example in U.S. Pat. No. 3 651 014. Appropriate products are also available commercially, for example Hytrel ® (Du Pont).

The novel thermoplastic molding materials contain, as component B), from 20 to 70, preferably from 30 to 60, in particular from 35 to 55%, by weight of a mixture of carbonates of metals of the 2nd main group of the Periodic Table.

Mixtures of $b_1$) a magnesium calcium carbonate of the general formula

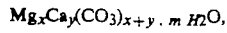

$$Mg_xCa_y(CO_3)_{x+y} \cdot m\ H_2O,$$

where x and y are each from 1 to 5, $x/y \geq 1$ and $m \geq 0$ and $b_2$) a basic magnesium carbonate of the general formula

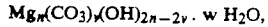

$$Mg_n(CO_3)_v(OH)_{2n-2v} \cdot w\ H_2O,$$

where n is from 1 to 6, v greater than 0 and less than 6, $n/v > 1$ and $w \geq 0$, have proven particularly suitable, the ratio of $b_1$) to $b_2$) being from 1:1 to 3:1.

The magnesium calcium carbonates $b_1$) may be both hydrated and anhydrous. The naturally occurring minerals, such as dolomite and huntite, are preferred. An anhydrous form in which x is 3 and y is 1, $Mg_3Ca(CO_3)_4$ (huntite), is particularly preferred.

The basic magnesium carbonates $b_2$) can likewise be used in both the hydrated and in the anhydrous form. Here too, the naturally occurring minerals, such as hydromagnesite, a hydrated compound in which n is 5 and v and w are each 4, $Mg_5(CO_3)_4(OH)_2 \cdot 4H_2O$, are preferred.

The ratio of $b_1)$ to $b_2)$ is particularly preferably from 1:1 to 2:1.

In addition to the components A) and B), the novel molding materials may furthermore contain from 0 to 2% by weight of fluorine-containing ethylene polymers. These are polymers of ethylene having a fluorine content of from 55 to 76, preferably from 70 to 76%, by weight.

Examples of these are polytetrafluoroethylene (PTFE), tetrafluoroethylene/hexafluoroethylene copolymers or tetrafluoroethylene copolymers containing relatively small amounts (as a rule up to 50% by weight) of co-polymerizable ethylenically unsaturated monomers. These are described, for example, by Schildknecht in Vinyl and Related Polymers, Wiley-Verlag, 1952, pages 484 to 494, and by Wall in Fluoropolymers (Wiley Interscience, 1972).

These fluorine-containing ethylene polymers are homogeneously distributed in the molding materials and preferably have a particle size $d_{50}$ (number average) of from 0.05 to 10 μm, in particular from 0.1 to 5 μm. These small particle sizes can be particularly preferably obtained by using aqueous dispersions of fluorine-containing ethylene polymers and incorporating them into a polyester melt.

The novel thermoplastic molding materials may furthermore contain from 0 to 40% by weight of fibers or particulate fillers or mixtures thereof, which of course differ from component B). As a rule, these are conventional additives and processing assistants, such as stabilizers, antioxidants, heat stabilizers, colorants, such as dyes and pigments, fibrous and pulverulent fillers and reinforcing agents, nucleating agents, plasticizers, etc.

Examples of antioxidants and heat stabilizers are halides of metals of group I of the Periodic Table, for example sodium, potassium and/or lithium halides, if necessary in conjunction with copper(I) halides, for example chlorides, bromides or iodides, sterically hindered phenols, hydroquinones, aromatic secondary amines, such as diphenylamines, various substituted members of these groups and mixtures thereof, in concentrations of up to 1% by weight, based on the weight of the thermoplastic molding material.

Examples of UV stabilizers, which are used in general in amounts of up to 2% by weight, based on the molding material, are various substituted resorcinols, salicylates, benzotriazoles and benzophenones.

Furthermore, organic dyes, such as nigrosine, and pigments, such as titanium dioxide, cadmium sulfide, cadmium selenide, phthalocyanines, ultramarine blue and carbon black, may be added as colorants, and fibrous and pulverulent fillers and reinforcing agents may be introduced. Examples of the latter are carbon fibers, glass fibers, amorphous silica, asbestos, calcium silicate (wollastonite), aluminum silicate, magnesium carbonate, kaolin, chalk, powdered quartz, mica and feldspar. The amount of such fillers and colorants is in general up to 40, preferably up to 30, in particular up to 25%, by weight.

The nucleating agents used may be, for example, talc, calcium fluoride, sodium phenyl phosphinate, alumina and finely divided polytetrafluoroethylene.

Examples of plasticizers are dioctyl phthalate, dibenzyl phthalate, butyl benzyl phthalate, hydrocarbon oils, N-n-butylbenzenesulfonamide and o- and p-tolyl-ethyl-sulfonamide.

To improve compatibility with the thermoplastic polyester, minerals and fillers may be treated with adhesion promoters. Glycidyl-, vinyl- and aminoalkyl-trialkoxysilanes are preferred.

The novel thermoplastic molding materials may furthermore contain from 0 to 60, preferably from 0 to 40%, by weight of a toughened polymer (also referred to below as an elastomeric polymer or elastomer).

Preferred types of such elastomers are the ethylene/propylene (EPM) or ethylene/propylene/diene (EPDM) rubbers.

EPM rubbers generally have virtually no more double bonds, whereas EPDM rubbers may have from 1 to 20 double bonds per 100 carbon atoms.

Examples of diene monomers for EPDM rubbers are conjugated dienes, such as isoprene and butadiene, non-conjugated dienes of 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methallyl-5-norbornene or 2-isopropenyl-5-norbornene, and tricyclodienes, such as 3-methyltricyclo[5.2.1.0.2.6]-3,8-decadiene, or mixtures thereof. Hexa-1,5-diene, 5-ethylidenenorbornene and dicyclopentadiene are preferred. The diene content of the EPDM rubbers is preferably from 0.5 to 50, in particular from 1 to 8%, by weight, based on the total weight of the rubber.

EPM and EPDM rubbers can preferably also be grafted with reactive carboxylic acids or derivatives thereof. Examples of these are acrylic acid, methacrylic acid and derivatives thereof, for example glycidyl (meth)acrylate, and maleic anhydride.

A further group of preferred rubbers are copolymers of ethylene with acrylic acid and/or methacrylic acid and/or the esters of these acids. In addition, the rubbers may contain dicarboxylic acids, such as maleic acid and fumaric acid, or derivatives of these acids, for example esters and anhydrides, and/or epoxy-containing monomers. These dicarboxylic acid derivatives or epoxy-containing monomers are preferably incorporated in the rubber by adding to the monomer mixture monomers containing dicarboxylic acid groups or epoxy groups and of the general formulae I or II or III or IV

$$R^1C(COOR^2)=C(COOR^3)R^4 \quad (I)$$

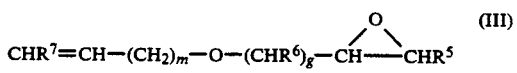

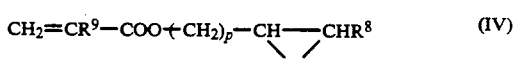

where $R^1$ to $R^9$ are each hydrogen or alky of 1 to 6 carbon atoms, m is an integer of from 0 to 20, g is an integer of from 0 to 10 and p is an integer of from 0 to 5.

$R^1$ to $R^9$ are each preferably hydrogen, m being 0 or 1 and g being 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and epoxy-containing esters of acrylic acid and/or methacrylic acid, such as glycidyl acrylate, glycidyl methacrylate and the esters of tertiary alcohols, such as tert-butyl acrylate. Although the latter have no carboxyl groups, they behave similarly to the free acids and are therefore designated as monomers having latent carboxyl groups.

The copolymers advantageously consist of from 50 to 98% by weight of ethylene, and from 0.1 to 20% by weight of epoxy-containing monomers and/or methacrylic acid and/or monomers containing anhydride groups, the remaining amount comprising (meth)acrylates.

Particularly preferred copolymers are those consisting of
from 50 to 98, in particular from 55 to 95%, by weight of ethylene,
from 0.1 to 40, in particular from 0.3 to 20%, by weight of glycidyl acrylate and/or glycidyl methacrylate, (meth)acrylic acid and/or maleic anhydride and
from 1 to 45, in particular from 10 to 40%, by weight of n-butyl acrylate and/or 2-ethylhexyl acrylate.

Further preferred esters of acrylic and/or methacrylic acid are methyl, ethyl, propyl, isobutyl and tert-butyl esters.

Vinyl esters and vinyl ethers may also be used as comonomers.

The ethylene copolymers described above may be prepared by conventional processes, preferably by random copolymerization under high pressure and at elevated temperatures. Appropriate processes are generally known.

Other preferred elastomers are emulsion polymers whose preparation is described, for example, by Blackley in the Monograph Emulsion Polymerization. The emulsifiers and catalysts which may be used are known per se.

In principle, homogeneous elastomers or elastomers having a shell structure may be used. The shell structure is determined by the order of addition of the individual monomers; the morphology of the polymer is also influenced by the order of addition.

Acrylates, for example n-butyl acrylate and 2-ethylhexyl acrylate, corresponding methacrylates, butadiene and isoprene and mixtures thereof may be mentioned here merely as typical monomers for the preparation of the rubber part of the elastomers. These monomers can be copolymerized with further monomers, for example styrene, acrylonitrile, vinyl ethers and further acrylates or methacrylates, such as methyl methacrylate, methyl acrylate, ethyl acrylate and propyl acrylate.

The flexible or rubber phase (having a glass transition temperature below 0° C.) of the elastomers may be the core, the outer shell or a middle shell (in the case of elastomers having a structure comprising more than two shells); in multi-shell elastomers, it is also possible for a plurality of shells to consist of a rubber phase.

If, in addition to the rubber phase, one or more rigid components (having glass transition temperatures of more than 20° C.) are present in the elastomers, they are generally prepared by polymerization of styrene, acrylonitrile, methacrylonitrile, α-methylstyrene, p-methylstyrene, acrylates and methacrylates, such as methyl acrylate, ethyl acrylate and methyl methacrylate, as main monomers. Here too, smaller amounts of further comonomers may also be used.

In some cases it has proven advantageous to use emulsion polymers which have reactive groups at the surface. Such groups are, for example, epoxy, carboxyl, latent carboxyl, amino or amido groups and functional groups which can be introduced by concomitantly using monomers of the general formula

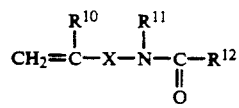

where $R^{10}$ is hydrogen or $C_1$-$C_4$-alkyl, $R^{11}$ is hydrogen, $C_1$-$C_8$-alkyl or aryl, in particular phenyl, $R^{12}$ is hydrogen, $C_1$-$C_{10}$-alkyl, $C_6$-$C_{12}$-aryl or —$OR^{13}$, $R^{13}$ is a $C_1$-$C_8$-alkyl or $C_6$-$C_{12}$-aryl group which may be substituted by O- or N- containing groups, X is a chemical bond, $C_1$-$C_{10}$-alkylene, $C_6$-$C_{12}$-arylene or

Y is O-Z or NH-Z and Z is $C_1$-$C_{10}$-alkylene or $C_6$-$C_{12}$-arylene.

The graft monomers described in EP-A 208 187 are also suitable for the introduction of reactive groups at the surface.

Further examples are acrylamide, methacrylamide and substituted esters of acrylic acid or methacrylic acid, such as N-tert-butylaminoethyl methacrylate, N,N-dimethylaminoethyl acrylate, N,N-dimethylaminomethyl acrylate and N,N-diethylaminoethyl acrylate.

The particles of the rubber phase may be crosslinked. Examples of monomers which react as crosslinking agents are buta-1,3-diene, divinylbenzene, diallyl phthalate and dihydrodicyclopentadienyl acrylate and the compounds described in EP-A 50 265.

Graft-linking monomers may also be used, i.e. monomers having two or more polymerizable double bonds which react at different rates during the polymerization. Preferably used compounds are those in which at least one reactive group polymerizes at about the same rate as the other monomers while the other reactive group (or reactive groups) polymerizes (polymerize), for example, substantially more slowly. The different polymerization rates result in a certain proportion of unsaturated double bonds in the rubber. If a further phase is subsequently grafted onto such a rubber, some or all of the double bonds present in the rubber react with the graft monomers with formation of chemical bonds, i.e. the grafted-on phase is linked to the grafting base partially or completely via chemical bonds.

Examples of such graft-linking monomers are allyl-containing monomers, in particular allylesters of ethylenically unsaturated carboxylic acids, such as allyl acrylate, allyl methacrylate, diallyl maleate, diallyl fumarate, diallyl itaconate or the corresponding monoallyl compounds of these dicarboxylic acids. There is also a large number of further suitable graft-linking monomers; for further details, reference may be made, for example, in U.S. Pat. No. 4,148,846.

In general, the amount of these crosslinking monomers in the toughening polymer is up to 5, preferably not more than 3%, by weight, based on the toughening A few preferred emulsion polymers are stated below. Firstly, graft polymers having a core and at least one outer shell may be mentioned, said polymers having the following composition:

| Type | Monomers for the core | Monomers for the graft |
|---|---|---|
| I | Buta-1,3-diene, isoprene, n-butyl acrylate, ethylhexyl acrylate or mixtures thereof | Styrene, acrylonitrile, methyl methacrylate |
| II | As for I but with the concomitant use of crosslinking agents | As for I |
| III | As for I or II | n-Butyl acrylate, ethyl acrylate, methyl acrylate, buta-1,3-diene, isoprene, ethyl hexyl acrylate |
| IV | As for I or II | As for I or III but with the concomitant use of monomers having reactive groups as described herein |
| V | Styrene, acrylonitrile, methyl methacrylate or mixes thereof | First graft of monomers as described under I and II for the core; Second graft as described under I or IV for the graft |

Instead of graft polymers having a multi-shell structure, homogeneous, i.e. one-shell, elastomers of buta-1,3-diene, isoprene and n-butyl acrylate or copolymers thereof may also be used. These products too can be prepared by the concomitant use of crosslinking monomers or monomers having reactive groups.

Examples of preferred emulsion polymers are n-butyl acrylate/(meth)acrylic acid copolymers, n-butyl acrylate/glycidyl acrylate or n-butyl acrylate/glycidyl methacrylate copolymers, graft polymers having an inner core of n-butyl acrylate or based on butadiene and an outer graft consisting of the abovementioned copolymers and copolymers of ethylene with comonomers which donate reactive groups.

The elastomers described can also be prepared by other conventional processes, for example by suspension polymerization.

Further preferred rubbers are polyurethanes, as described in EP-A 115 846, EP-A 115 847, EP-A 116 456, EP-A 117 664 and EP-A 327 384. Such products are commercially available, for example, under the names Desmopan ® (Bayer AG) or Elastollan ® (Elastogran Polyurethane GmbH).

Silicone rubbers, as described in DE-A 37 25 576, EP-A 235 690, DE-A 38 00 063 and EP-A 319 290, are likewise preferred.

Mixtures of the abovementioned types of rubbers may of course also be used.

The novel thermoplastic molding materials can be prepared by conventional processes, by mixing the starting components in a conventional mixing apparatus, such as a screw extruder, a Brabender mill or a Banbury mill, and then carrying out the extrusion. After the extrusion, the extrudate can be cooled and comminuted. It is also possible to premix individual components and then add the remaining starting materials individually and/or likewise as a mixture. The mixing temperatures are, as a rule, from 230° to 290° C.

The novel thermoplastic molding materials have good flameproof properties in conjunction with good mechanical and electrical properties. They are suitable for the production of fibers, films and moldings.

EXAMPLES

Preparation of the Thermoplastic Molding Materials

EXAMPLES 1 AND 2

A polybutylene terephthalate having a number average molecular weight $M_n$ of 25,000 and a viscosity number of 125 ml/g (measured using a 0.5% strength by weight solution in phenol/dichlorobenzene (weight ratio 1:1)) (Ultradur ® B 4500 from BASF AG, component A) was mixed with a mixture of of $Mg_3Ca(CO_3)_4$ (huntite) and $Mg_5(CO_3)_4(OH)_2 \cdot 4H_2O$ (hydromagnesite) (weight ratio of huntite to hydromagnesite=2:1, component B) in a twin-screw extruder (ZSK 53 from Werner & Pfleiderer) at 260° C., at 120 rpm and with a throughput of 30 kg/h, the mixture was extruded, the extrudate was cooled and comminuted and the granules were dried at 80° C. under reduced pressure for 8 hours and then injection molded at 260° C. to give test specimens.

EXAMPLE 3

The procedure in Examples 1 and 2 was followed, but with the addition of glass rovings having a diameter of 10 μm.

COMPARATIVE EXAMPLES V1 TO V3

The procedure in Examples 1 and 2 was followed, except that only hydromagnesite (V1) or only huntite (V2) or $Mg(OH)_2$ (V3) was added instead of component B).

The compositions and the properties are summarized in the Table.

The viscosity number IV was determined using a 0.5% strength by weight solution in phenol/o-dichlorobenzene (weight ratio 1:1). The modulus of elasticity was determined according to DIN 53,457, the impact strength $a_n$ according to DIN 53,453 and the tensile strength according to DIN 53,455. The creep resistance (CTI) was determined according to DIN 112, ASTM-D 3638.

The flameproof test was carried out by the vertical fire test according to the regulations of the Underwriter Laboratories. The test specimens used were ⅛" and 1/16" fire rods. An open flame (flame height 19 mm) was applied twice for 10 seconds to each of a set of 5 samples measuring 127 mm × 12.7 mm × 1.7 mm. In the case of all samples, the subsequent combustion time for each flame application was measured, resulting in classification in the various fire classes.

TABLE

| Example test | Composition [% by weight] | | | | | | IV [ml/g] | Modulus of elasticity [N/mm2] | [kJ/m2] | $a_n$ [N/mm2] | Tensile strength [Volt] | CTI ⅛" | Fire 1/16" |
|---|---|---|---|---|---|---|---|---|---|---|---|---|---|
| | A) | B) | Glass fibers | Hydro-magnesite | Hun-tite | Mg(OH)2 | | | | | | | |
| 1 | 60 | 40 | — | — | — | — | 125 | 6,400 | 25 | 50 | 550 | V-1 | V-2 |
| 2 | 55 | 45 | — | — | — | — | 128 | 7,000 | 14 | 45 | 550 | V-0 | V-0 |
| 3 | 45 | 45 | 10 | — | — | — | 125 | 10,000 | 10 | 65 | 500 | V-0 | V-0 |
| V1 | 55 | — | — | 45 | — | — | 80 | 6,500 | 4 | 30 | — | — | — |
| V2 | 55 | — | — | — | 45 | — | 125 | 7,000 | 10 | 35 | — | V- | V- |

TABLE-continued

| Example test | Composition [% by weight] | | | | | | IV [ml/g] | Modulus of elasticity [N/mm2] | [kJ/m2] | $a_n$ [N/mm2] | Tensile strength [Volt] | CTI ⅟" | Fire 1/16" |
|---|---|---|---|---|---|---|---|---|---|---|---|---|---|
| | A) | B) | Glass fibers | Hydro-magnesite | Hun-tite | $Mg(OH)_2$ | | | | | | | |
| V3 | 55 | — | — | — | — | 45 | | not compoundable | | | | | |

We claim:

1. A thermoplastic molding material containing, as essential components,

A) from 30 to 80% by weight of a thermoplastic polyester and

B) from 20 to 70% by weight of a mixture of carbonates wherein a mixture of b₁) a magnesium calcium carbonate of the formula $$MG_xCa_y(CO_3)_{x+y} \cdot m\ H_2O,$$

where x and y are each from 1 to 5, $x/y \geq 1$ and $m \geq 0$, and b₂) a basic magnesium carbonate of the formula $$MG_n(CO_3)_v(OH)_{2n-2v} \cdot W\ H_2O,$$

where n is from 1 to 6, v is greater than 0 and less than 6, $n/v >$ and $w \geq 0$, is used as component B, the ratio of B₁) to b₂) being from 1:1 to 3:1.

2. A thermoplastic molding material as claimed in claim 1, wherein component A) is used in an amount of from 40 to 70% by weight and component B) is used in an amount of from 30 to 60% by weight.

3. A molding obtainable from the thermoplastic molding material as claimed in claim 1 as an essential component.

* * * * *

UNITED STATES PATENT AND TRADEMARK OFFICE
CERTIFICATE OF CORRECTION

PATENT NO. : 5,298,547
DATED : March 29, 1994
INVENTOR(S) : GAREISS et al.

It is certified that error appears in the above-indentified patent and that said Letters Patent is hereby corrected as shown below:

Claim 1, column 9, line 18, "MG" should be --Mg--

Claim 1, column 10, line 15, "$B_1$)" should be --$b_1$)--

Signed and Sealed this

Sixteenth Day of August, 1994

BRUCE LEHMAN

Attest:

Attesting Officer

Commissioner of Patents and Trademarks